Oct. 11, 1938. S. BOHN 2,132,931
WRAPPING PAPER AND METHOD OF MAKING SAME
Filed Dec. 6, 1934
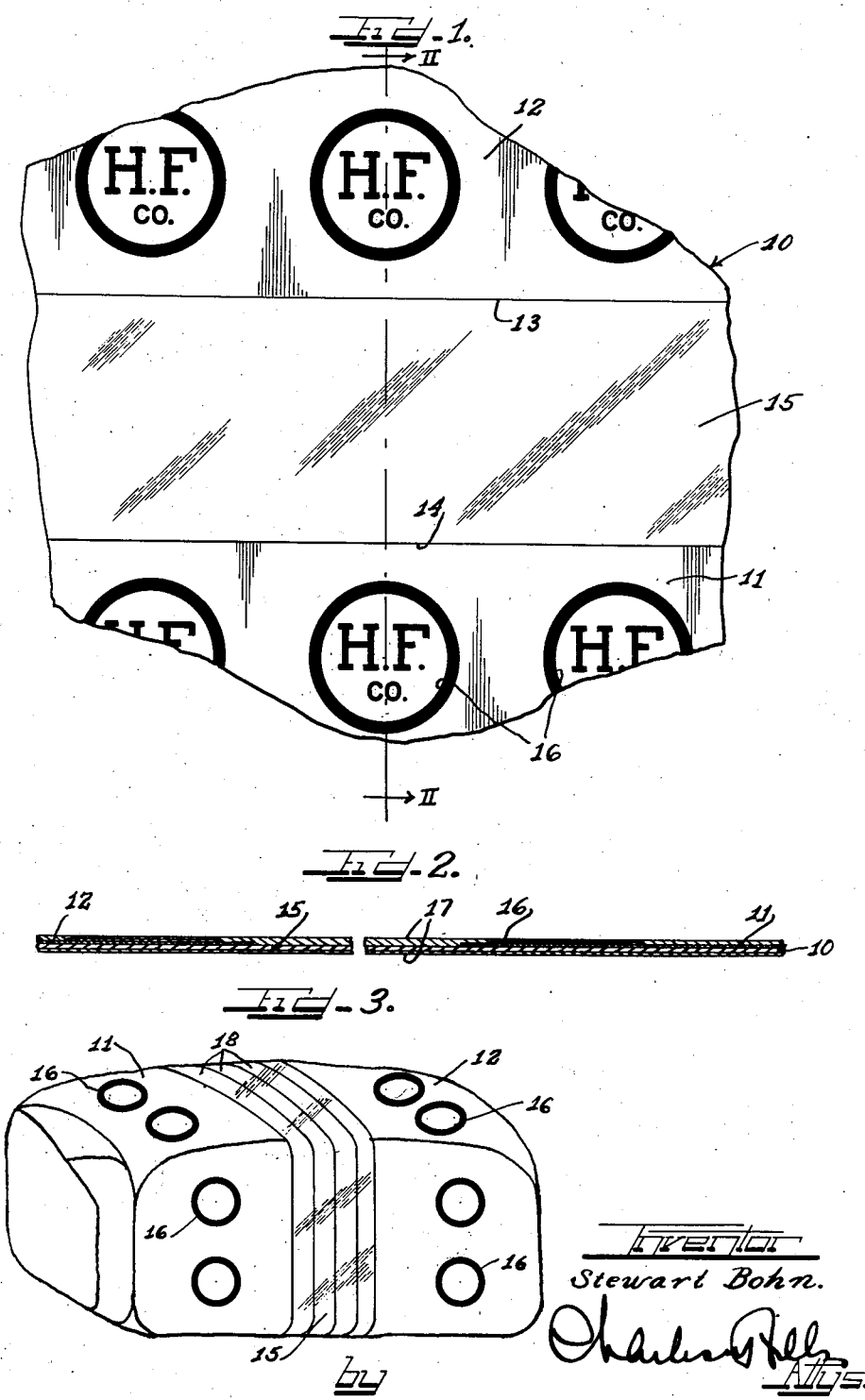

Patented Oct. 11, 1938

2,132,931

UNITED STATES PATENT OFFICE 2,132,931

WRAPPING PAPER AND METHOD OF MAKING SAME

Stewart Bohn, St. Paul, Minn., assignor to Rapinwax Paper Company, St. Paul, Minn., a corporation of Minnesota Application December 6, 1934, Serial No. 756,258

3 Claims. (Cl. 91—67.9)

This invention relates to wrapping paper and to a method of making the same. More particularly, the invention relates to the manufacture of a bread wrap, or the like, of an integral character and having opaque coated portions separated by semi-transparent portions intermediate the ends of the wrapping sheet to permit visual inspection of the contents of the wrapper.

It has heretofore been proposed to unite strips of opaque paper to the marginal edges of a strip of transparent film or sheet material, such as regenerated cellulose, so that when a loaf of bread is wrapped with a composite sheet thus fabricated, the loaf of bread can be visibly inspected through the transparent intermediate portion. An objection, however, to this type of composite sheet is that it is relatively expensive to manufacture and requires the use of relatively expensive transparent sheet or film material.

According to the present invention, an integral sheet of paper is so treated as to render portions of it opaque and other portions semi-transparent, these portions preferably being so arranged as to give opaque end portions of considerable area and an intermediate stripe or band of relative transparency.

It is therefore an important object of this invention to provide a method of making a wrapping sheet having coated opaque end portions and a central portion of a relatively high degree of transparency so as to permit visual inspection of goods which may be wrapped therein.

It is a further important object of this invention to provide a relatively inexpensive wrapper for bread and the like which is formed from an integral sheet of paper with extensive portions that are opaque and bear printed designs and with another portion, or other portions, that is, or are, transparent and through which the goods wrapped may be viewed.

Other and further important objects of this invention will become apparent from the following description and appended claims.

On the drawing:

Figure 1 is a fragmentary plan view of a wrapper embodying the principles of this invention.

Figure 2 is a broken, greatly enlarged sectional view of the wrapper.

Figure 3 is an elevational view of a loaf of bread enveloped in a wrapper of my invention.

As shown on the drawing:

The reference numeral 10 indicates a sheet of paper, which can be rendered transparent or semi-transparent by proper treatment. Examples of suitable types of paper are sulphite, glassine, and other papers of a greaseproof, semi-greaseproof or non-greaseproof character. The sheet 10 is provided with opaque coated areas, indicated at 11 and 12, extending inwardly from opposite margins of the sheet. These opaque portions 11 and 12 are continuous and uniformly opaque over their entire areas, which preferably extend from the margins, or near the edges of the sheet inwardly to a distance indicated by the spaced parallel lines 13 and 14. The portion of the sheet indicated at 15 between said spaced parallel lines 13 and 14 is left uncoated for a purpose that will presently appear.

It is obvious, of course, that the opaque portions 11 and 12 and the unopaqued portion 15 may occur as alternating bands or stripes running the length or width of the sheet, or otherwise thereof. Preferably, however, the uncoated portion 15 is centrally positioned with respect to the opposite ends or sides of the sheet, so that when a loaf of bread or other article is wrapped, there will be a central band corresponding with the unopaqued portion 15 extending around or along the middle of the article.

The opaque portions 11 and 12 may be suitably printed to bear advertising or identifying indicia 16. Thereafter, a wax coating 17 is applied over one or both, and preferably both, of the surfaces of the sheet. In place of a wax coating, any coating of waxes, resins, gums, mixtures thereof or the like that will transparentize the unopaqued portion or portions 15 can be used. Preferably a transparentizing coating material is selected that will also waterproof the wrapping sheet and give it self- or heat-sealing properties.

The coating of the fibrous sheet 10 to give the opaque portions 11 and 12 is carried out in any conventional manner by the use of a coating composition containing suitable pigments, such as titanium dioxide, or mixtures of titanium dioxide and calcium sulphate, or barium sulphate. The opaque portions 11 and 12 may be colored, if desired, as by means of dyes or colored pigments. After the coating has been applied and has dried, the printing operation is next performed. Thereafter, the sheet is given a treatment to bring out the transparency of the unopaqued portion, or portions. Such treatment can be a wax treatment or one employing resins, gums and the like, which will give the desired effect of transparency to the unopaqued portion, or portions, and, when desired, self-sealing properties to the sheet or any desired portion thereof. Where wax is used as the transparentizing agent, the transparency of the unopaqued portion, or portions, 15 will be enhanced if those portions of the sheet are thoroughly impregnated with the wax as well as coated therewith.

Fig. 3 illustrates the manner in which my wrapper may be used and is there shown as being wrapped around a loaf of bread, the slices 18 showing through the transparentized band 15 of the wrapper. The opaque portions 11 and 12 cover the end of the load and bear the advertising or identifying indicia 16. The printed matter 16 shows off to better advantage when carried by the opaque portions of the wrapper than where it occurs on semi-transparent portions.

It will, however, be understood that printed matter may also be placed on the unopaqued portions, if desired. While my invention has been particularly described with reference to a bread wrapper, it is obvious that the invention is applicable to the wrapping of goods generally.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of forming a wrapper for loaves of bread and the like, which comprises coating extensive end portions of a paper sheet to provide rectilinear opaque areas spaced apart by an intermediate band of the uncoated sheet, printing a design on the opaque portions and impregnating the sheet throughout with wax to form a wax coating thereover and simultaneously transparentize the intermediate band of paper.

2. The method of producing a wrapper which includes, applying an opaque coating in a comparatively wide strip to each longitudinal edge portion of a single sheet of semi-transparent material, whereby parallel opaque coated strips with a central uncoated strip are formed on said sheet, and then coating the entire area of the sheet with a transparentizing agent selected from the group consisting of waxes, gums, resins, and mixtures thereof to develop transparency in the uncoated strip.

3. A wrapper comprising a single integral sheet of paper having a comparatively wide strip of opaque coating along each longitudinal edge portion and an intermediate unopaqued strip, said sheet having a waxy coating over the entire area thereof that renders said intermediate strip semi-transparent.

STEWART BOHN.